(12) United States Patent
Ziemer

(10) Patent No.: US 10,309,490 B2
(45) Date of Patent: Jun. 4, 2019

(54) DEVICE FOR SWITCHING A FIRST AND SECOND SWITCHING ELEMENT, AND TRANSMISSION COMPRISING SUCH A DEVICE

(71) Applicant: ZF Friedrichshafen AG, Friedrichshafen (DE)

(72) Inventor: Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 169 days.

(21) Appl. No.: 15/309,868

(22) PCT Filed: Apr. 9, 2015

(86) PCT No.: PCT/EP2015/057652
§ 371 (c)(1),
(2) Date: Nov. 9, 2016

(87) PCT Pub. No.: WO2015/169524
PCT Pub. Date: Nov. 12, 2015

(65) Prior Publication Data
US 2017/0146098 A1    May 25, 2017

(30) Foreign Application Priority Data

May 9, 2014    (DE) .................. 10 2014 208 794

(51) Int. Cl.
*F16H 63/20*    (2006.01)
*F16H 3/66*    (2006.01)
(Continued)

(52) U.S. Cl.
CPC .............. *F16H 3/66* (2013.01); *B60K 6/365* (2013.01); *B60K 6/387* (2013.01); *B60K 6/547* (2013.01);
(Continued)

(58) Field of Classification Search
CPC .... F16H 3/66; F16H 63/20; F16H 2200/2007; F16H 2200/2094; F16H 2200/2064
(Continued)

(56) References Cited

U.S. PATENT DOCUMENTS 1,050,522 A    1/1913    Damaizin et al.
4,182,202 A    1/1980    Grey
(Continued)

FOREIGN PATENT DOCUMENTS

DE        364373 C    11/1922
DE        1211077 A    2/1966
(Continued)

OTHER PUBLICATIONS

German Search Report DE102014208794.5, dated Jan. 29, 2015. (7 pages).
(Continued)

*Primary Examiner* — Jeffrey A Shapiro
(74) *Attorney, Agent, or Firm* — Dority & Manning, P.A.

(57) ABSTRACT

A shifting device includes a first shifting element operable to establish a torque-proof, positive-locking connection between a first element and a second element. A second shifting element is operable to establish a torque-proof, positive-locking connection between the second element and a third element. The first element is coupled to the third element such that displacement of the first element by a common actuating element in one of a first and a second displacement direction provides rectified displacement of the third element. The third element is coupled to the first element such that displacement of the third element by the common actuating element in one of the first and second displacement directions provides rectified displacement of the first element. The second element is fixed in position in
(Continued)

both the first and second displacement directions. A related transmission is also provided.

12 Claims, 6 Drawing Sheets

(51) Int. Cl.
  *B60K 6/365* (2007.10)
  *B60K 6/387* (2007.10)
  *B60K 6/547* (2007.10)
  *F16H 63/30* (2006.01)
  *F16H 3/72* (2006.01)
  *F16D 11/14* (2006.01)

(52) U.S. Cl.
  CPC ............. *F16D 11/14* (2013.01); *F16H 3/725* (2013.01); *F16H 63/20* (2013.01); *F16H 63/3069* (2013.01); *F16H 2200/201* (2013.01); *F16H 2200/2007* (2013.01); *F16H 2200/2023* (2013.01); *F16H 2200/2046* (2013.01); *F16H 2200/2064* (2013.01); *F16H 2200/2094* (2013.01)

(58) Field of Classification Search
  USPC .................................................. 475/298, 303
  See application file for complete search history.

(56) References Cited

U.S. PATENT DOCUMENTS

| | | | | |
|---|---|---|---|---|
| 6,645,114 B1* | 11/2003 | Biallas | ................... | F16H 3/006 475/271 |
| 6,811,010 B1* | 11/2004 | Armstrong | ............. | F16D 23/06 192/48.91 |
| 7,070,535 B2 | 7/2006 | Wittkopp et al. | | |
| 7,682,281 B2* | 3/2010 | Ziemer | ................... | F16H 3/006 475/275 |
| 7,699,746 B2* | 4/2010 | Maguire | ............... | F16D 41/125 188/82.74 |
| 7,713,161 B2* | 5/2010 | Kamm | .................... | F16H 3/666 475/277 |
| 7,766,779 B2* | 8/2010 | Belmont | ................ | B60K 6/365 192/69.8 |
| 8,118,703 B2* | 2/2012 | Puiu | ....................... | B60K 6/387 477/3 |
| 8,202,190 B2* | 6/2012 | Phillips | ..................... | F16H 3/66 475/275 |
| 8,353,803 B2* | 1/2013 | Saitoh | ........................ | F16H 3/66 475/214 |
| 8,483,918 B2* | 7/2013 | Arnold | ................ | F16H 61/0403 474/11 |
| 8,500,601 B2* | 8/2013 | Arnold | ................ | F16H 61/0403 475/303 |
| 8,690,722 B2* | 4/2014 | Phillips | ............... | G06F 11/3688 475/280 |
| 8,858,386 B2* | 10/2014 | Wittkopp | ................ | F16H 3/666 475/275 |
| 8,858,387 B2* | 10/2014 | Haupt | ...................... | F16H 3/66 475/282 |
| 8,960,034 B2* | 2/2015 | Takahashi | .............. | B60K 6/445 475/5 |
| 8,960,041 B2 | 2/2015 | Buhrke | | |
| 9,011,289 B2* | 4/2015 | Goleski | ................ | F16D 25/061 192/48.6 |
| 9,145,960 B2* | 9/2015 | Phillips | ................... | F16H 3/006 |
| 9,360,109 B2* | 6/2016 | Weingartz | ........... | F16H 61/2807 |
| 9,409,562 B2* | 8/2016 | Choi | ........................ | F16H 61/04 |
| 9,657,835 B2* | 5/2017 | Han | ........................ | F16H 3/083 |
| 2002/0042318 A1* | 4/2002 | Brown | ................ | B60K 17/3467 475/204 |
| 2004/0235607 A1 | 11/2004 | Haka | | |
| 2007/0149345 A1* | 6/2007 | Ziemer | ..................... | F16H 3/66 475/303 |
| 2008/0176695 A1 | 7/2008 | Janson et al. | | |
| 2009/0137358 A1* | 5/2009 | Braford | ................... | F16H 3/006 475/271 |
| 2009/0170649 A1* | 7/2009 | Murakami | ............. | B60K 6/365 475/5 |
| 2009/0280942 A1* | 11/2009 | Gumpoltsberger | ...... | F16H 3/006 475/31 |
| 2010/0248884 A1* | 9/2010 | Tremblay | .................. | F16H 3/54 475/138 |
| 2013/0196813 A1* | 8/2013 | Oita | .......................... | F16H 3/66 475/284 |
| 2014/0128205 A1* | 5/2014 | Phillips | ................... | F16H 37/04 475/303 |
| 2014/0221149 A1* | 8/2014 | Wilton | ...................... | F16H 3/62 475/276 |
| 2016/0047440 A1* | 2/2016 | Long | ........................ | F16H 3/06 475/269 |

FOREIGN PATENT DOCUMENTS

| | | |
|---|---|---|
| DE | 1400675 A | 4/1969 |
| DE | 102004024866 A1 | 12/2004 |
| DE | 102004060991 A1 | 8/2005 |
| DE | 102005021104 A1 | 12/2005 |
| DE | 102005038681 A1 | 3/2007 |

OTHER PUBLICATIONS

International Search Report (English Translation) PCT/EP2015/057652, dated Jun. 24, 2015. (2 pages).

* cited by examiner

DEVICE FOR SWITCHING A FIRST AND SECOND SWITCHING ELEMENT, AND TRANSMISSION COMPRISING SUCH A DEVICE

FIELD OF THE INVENTION

The invention relates generally to a device for shifting a first shifting element and a second shifting element, whereas the first shifting element can establish a torque-proof, positive-locking connection between a first element and a second element, and whereas the second shifting element can establish a torque-proof, positive-locking connection between the second element and a third element, whereas the actuation of the first shifting element and the second shifting element takes place through the longitudinal displacement of a common actuating element, whereas the first shifting element is closed and the second shifting element is open in a first shifting state, whereas the first shifting element is open and the second shifting element is closed in a second shifting state, along with a transmission for a motor vehicle with such a device.

BACKGROUND

Devices for shifting a first shifting element and a second shifting element are used, in particular, in motor vehicle transmissions in order to connect rotatably mounted spur gears to the shaft in a torque-proof manner.

For example, a shifting arrangement for displacing a shift fork of a multi-stage shift transmission assembly along a shifting rod is known from patent application DE 10 2005 038 681 A1. Therein, a first gear wheel and a second gear wheel are arranged on a shaft in a freely rotatable manner. A clutch sleeve equipped with a circumferential groove is arranged on the shaft in an axially displaceable manner. It is provided with an internal toothing, which meshes with an external toothing of the shaft. Lugs of a shift fork engage in the groove of the clutch sleeve, such that the latter can be displaced in an axial manner, and that, optionally, the internal toothing of the clutch sleeve can be brought into engagement with an external toothing of one of the adjacent gear wheels.

Such an arrangement is particularly advantageous in the structure described above, since, in the case of such spur gear transmissions, the clutch sleeves are easily accessible for the shifting fork.

On the other hand, transmissions with one or even a multiple number of planetary gear sets coupled to each other feature significantly poorer accessibility to the shifting elements. Frequently, elaborate bridgings of differential rotational speeds of a mechanical or hydraulic type are required in order to actuate the shifting elements of such transmissions. This increases the complexity and the error rate of the transmission.

SUMMARY OF THE INVENTION

Therefore, exemplary aspects of the invention provide a device for shifting two shifting elements, which enables a reliable and simple actuation of the two shifting elements, even in the case of difficult accessibility.

A torque-proof, positive-locking connection between a first element and a second element can be established through a first shifting element. Through a second shifting element, a torque-proof, positive-locking connection between the second element and a third element can be established. Both shifting elements are actuated by a common actuating element.

A first shifting state is established through the longitudinal displacement of the common actuating element in a first displacement direction. In this first shifting state, the first shifting element is closed and the second shifting element is open, such that there is a torque-proof, positive-locking connection between the first element and the second element. A second shifting state is established through the longitudinal displacement of the common actuating element into a second displacement direction that is opposite to the first displacement direction. In this second shifting state, the first shifting element is open and the second shifting element is closed, such that there is a torque-proof, positive-locking connection between the second element and the third element.

In accordance with exemplary aspects of the invention, the first and third elements are coupled with each other, such that a displacement of the first element leads, through the common actuating element, to a rectified displacement of the third element, and vice versa. The second element is fixed in position in both displacement directions. Accordingly, upon a shifting process between the two shifting states, the second element, which is allocated to both the first and the second shifting elements, is not displaced. Instead, the first and third elements are displaced together. This leads to a substantial simplification of the actuation of the first and second shifting elements, as illustrated in the examples shown below.

According to a first embodiment, the first element is connected in a torque-proof manner to a carrier of a planetary gear set, and the third element is connected in a torque-proof manner to a ring gear or a sun gear of the same planetary gear set. The common actuating element is arranged on a first side of the planetary gear set. The second element is arranged on a second side of the planetary gear set, which is opposite to the first side.

Such a geometry can be present, for example, if a rotating structural element, which blocks access to the second element, is located radially outside and/or inside the second element. Such a rotating structural element can be formed, for example, by the rotor of an electric motor or by a shaft adjoining the planetary transmission. In other words, there may be an external constraint that prevents the second element and the common actuating element from being arranged on the same side of the planetary gear set.

Since both the first and the third elements can feature different rotational speeds than the second element, up to two differential rotational speeds must be overcome for a displacement of the second element through the common actuating element, starting from the first side of the planetary gear set. On the other hand, through the common displacement of the first and third elements, in such a case, only one differential rotational speed must be overcome for each of such elements. This simplifies the complexity of the shifting device and improves the mode of action of the shifting device, by shortening the tolerance chain.

The first element is preferably connected in a torque-proof manner to the carrier of the planetary gear set, but is designed to be displaceable in an axial manner. The carrier itself is fixed in the axial direction, for example by a stop. This axial displaceability and simultaneous torque-proof connection can be designed, for example, by a suitably formed synchronization toothing between the first element and the carrier. in the same manner, the third element can be displaceable in an axial manner relative to the sun gear or ring gear. As a result, extensive modifications are not necessary at the planetary gear set and at its mounting assembly.

According to a second embodiment, the second element is connected to the ring gear of the planetary gear set, whereas the ring gear consists of a first segment and a second segment, which are not directly connected to each other. The two segments are operatively connected to each other through correspondingly long planetary gears. A shaft, which is connected to the carrier of the planetary gear set, can lead between the segments of a ring gear that is split in such a manner. If the effective diameters of the two segments of the ring gear are identical, the rotational speeds of the two segments are also identical, as if they were connected to each other. Therefore, when viewed in terms of rotational speed, both segments can be regarded as components of a single shaft or a single element, as the case may be. A torque-proof, positive-locking connection to the first segment of the ring gear can be established through the first element, and a torque-proof, positive-locking connection to the second segment of the ring gear can be established through the third element. Thereby, the connection to the ring gear segments does not have to be formed directly at the segments, but can also be formed at a shaft connected to the respective segments.

A ring gear that is split in such a manner is only useful if it is not constantly fixed in a torque-proof manner. If, given an external constraint, the first element is easily accessible only at the first segment of the ring gear or a shaft connected to it, and if the third element is easily accessible only at the second segment of the ring gear or a shaft connected to it, then, with a conventional actuation, that shaft that is arranged between the segments must be bridged. However, a bridging of the differential rotational speed at this location is unfavorable, given the high relative speeds that necessarily arise at the diameter of the ring gear. On the other hand, through the common displacement of the first and third elements, their accessibility at the two segments becomes an advantage, since the planetary gear set can be bypassed externally. In such a manner, the bridging of the differential rotational speed can also be effected more simply at a diameter at which the relative speeds are lower than at the ring gear. If the first or third element is fixed in a torque-proof manner, no bridging at all of the differential rotational speed is required for such element. This additionally simplifies the shifting device.

In the same manner, the invention can be applied at a split sun gear, which features a first segment and a second segment separated from it. This is particularly advantageous if the first or third element is fixed in a torque-proof manner.

Preferably, a possible difference in rotational speeds between the common actuating element and the first or the third element, as the case may be, is overcome by a bridging device. The common actuating element, which usually features no rotational speed, thereby engages in a groove of the bridging device through suitably formed lugs. The bridging device itself rotates with the rotational speed of the first or third element allocated to it. Through the displacement of the common actuating element along one of the two displacement directions, the lugs engage in an inner surface of the groove, and, in such a manner, displace the bridging device.

If both the rotational speed of the first element and the rotational speed of the third element deviate from the zero rotational speed of the common actuating element, a first bridging device is preferably arranged in the operative connection between the common actuating element and the first element, and a second bridging device is arranged in the operative connection between the common actuating element and the third element. The first and second bridging devices are arranged parallel to each other. Thereby, the parallel arrangement is not to be understood geometrically, but in its mode of action. In other words, only one bridging device is arranged in the operative connection between the common actuating element and each of the first and third elements. This reduces the tolerance chain of the shifting device.

Preferably, the bridging device or the bridging devices, as the case may be, are arranged, in a radial manner, inside the carrier of the planetary gear set. If the shifting device is used in a transmission with a multiple number of planetary gear sets, the bridging device or the bridging devices, as the case may be, are to be arranged, in a radial manner, inside that carrier that is the smallest distance from a central axis of the transmission. In any event, each bridging device is be arranged in such a manner that the effective diameter of the groove allocated to the bridging device is as small as possible, in order to minimize the relative speed between the fixed actuating element and the rotating groove.

According to one arrangement, in a middle position of the common actuating element between the first and second shifting states, the device can assume a third shifting state, in which the first and the second shifting element are open. This increases the flexibility of the shifting device.

The invention also relates to a transmission for a motor vehicle, which features at least one device proposed in accordance with exemplary aspects of the invention for shifting a first shifting element and a second shifting element.

Herein, a transmission in particular designates a multi-speed transmission, with which a predetermined number of gears, thus fixed transmission ratio relationships between a transmission input shaft and the transmission output shaft, are automatically shiftable by shift elements. Herein, the shift elements comprise, for example, clutches or brakes. Such transmissions are primarily used in automotive applications, in order to adjust the rotational speed and torque output capabilities of the drive unit to the driving resistance of the motor vehicle in a suitable manner.

Such a transmission may comprise, for example, a gear set that features at least two planetary gear sets with a multiple number of shafts. Thereby, one first shifting element and one second shifting element are allocated to at least one selected shaft of the gear set. Through the first shifting element, a torque-proof, positive-locking connection to one element of the transmission is established. Through the second shifting element, a torque-proof, positive-locking connection to an additional element of the transmission is established. In a first shifting state, the first shifting element is closed and the second shifting element is open, such that only the first shifting element establishes the torque-proof, positive-locking connection. In such first shifting state, the second shifting element does not establish any connection to the selected shaft of the gear set. In a second shifting state, the first shifting element is open, and the second shifting element is closed. In addition, a third shifting state can also be provided, in which neither the first shifting element nor the second shifting element is closed.

The selected shaft of the gear set is fixed in the axial direction by a suitable mounting. One or more synchronization toothings are formed at the selected shaft of the gear set. Through the engagement of complementary synchronization toothings with the synchronization toothing at the selected shaft of the gear set, the positive-locking, torque-proof connection of the first and second shifting elements is established. The complementary synchronization toothings of the first and second shifting elements are coupled with each other and are displaceable in an axial manner, such that, upon a displacement of a common actuating element into a first displacement direction parallel to the axis of the selected shaft of the gear set, the synchronization toothing of the first shifting element is brought into engagement with the synchronization toothing at the selected shaft of the gear set. Upon a displacement of the common actuating element into a second displacement direction opposite to the first displacement direction, the synchronization toothing of the second shifting element is brought into engagement with the synchronization toothing at the selected shaft of the gear set.

A "shaft" is not solely understood as, for example, a cylindrical, rotatably mounted machine element for the transfer of torques, but is also understood as a general connection element, which connects individual components or elements to each other, in particular connection elements that connect several elements to each other in a torque-proof manner.

A planetary gear set comprises a sun gear, a carrier and a ring gear. Planetary gears, which mesh with the toothing of the sun gear and/or with the toothing of the ring gear, are rotatably mounted on the carrier. A negative gear set describes a planetary gear set with a carrier, on which the planetary gears are rotatably mounted, with a sun gear and a ring gear, whereas the toothing of at least one of one of the planetary gears meshes both with the toothing of the sun gear and with the toothing of the ring gear, by which the ring gear and the sun gear rotate in opposite directions of rotation, if the sun gear rotates with a fixed carrier.

A positive gear set differs from the negative planetary gear set just described in that the positive gear set features inner and outer planetary gears, which are rotatably mounted on the carrier. Thereby, the toothing of the inner planetary gears meshes, on the one hand, with the toothing of the sun gear and, on the other hand, with the toothing of the outer planetary gears. In addition, the toothing of the outer planetary gears meshes with the toothing of the ring gear. This has the consequence that, with a fixed carrier, the ring gear and the sun gear rotate in the same direction of rotation.

Through shift elements, depending on their operating state, a relative movement between two components is enabled, or a connection for the transmission of a torque between the two components is established. A "relative movement" is understood as, for example, a rotation of two components, whereas the rotational speed of the first component and the rotational speed of the second component differ from each other. In addition, the rotation of only one of the two components is conceivable, while the other component is at a standstill or rotates in the opposite direction. In the subject invention, the shift elements are preferably designed as claw shift elements, which establish the connection by a positive connection.

Two elements are referred to as connected to each other particularly if there is a fixed (in particular, torque-proof) connection between the elements. Such connected elements rotate with the same rotational speed. The various components and elements of the specified invention may be connected to each other through a shaft or through a locked shift element or a connection element, or also directly, for example by a welded connection, a crimping connection or another connection.

Furthermore, two elements are described as connectable if there is a detachably torque-proof connection between such elements. If the connection exists, such elements rotate with the same rotational speed.

BRIEF DESCRIPTION OF THE DRAWINGS

Embodiments of the invention are described in detail on the basis of the attached figures.

DETAILED DESCRIPTION

Figure 1:
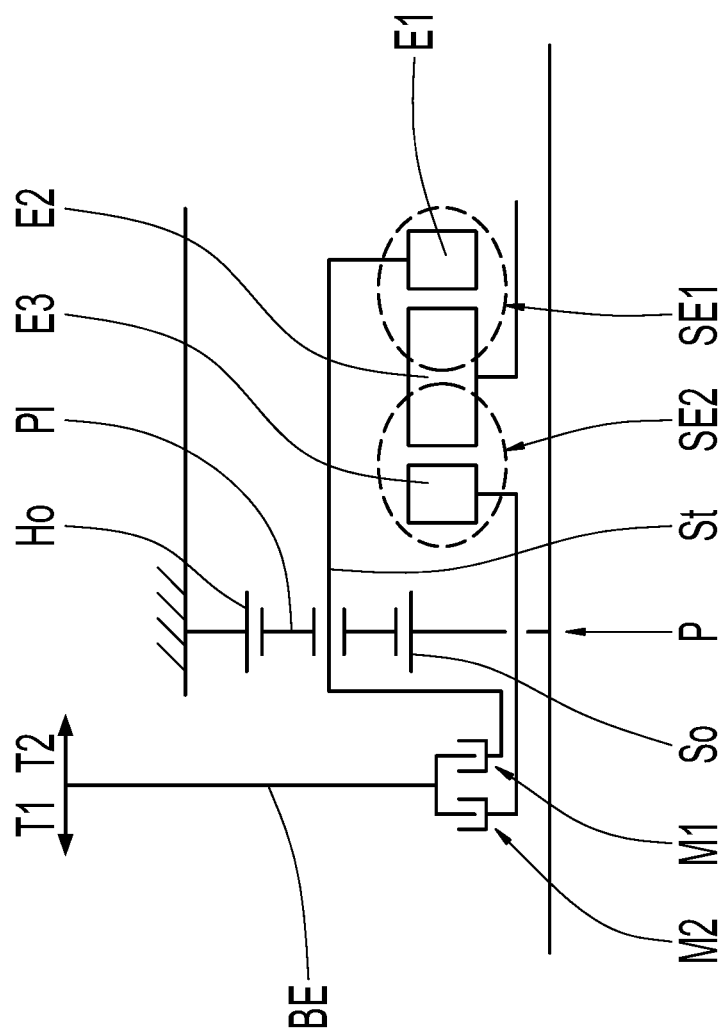
FIG. 1 schematically shows a first example embodiment of the shifting device.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

At the outset, it must be stated that, in the various described embodiments, the same parts are provided with the same reference signs or the same component names, whereby the disclosures contained throughout the description can be transferred analogously to the same parts with the same reference signs or the same component names.

FIG. 1 schematically shows a first embodiment of the shifting device. A planetary gear set P comprises a sun gear So, a carrier St, at least one planetary gear Pl and a ring gear Ho. The ring gear Ho is constantly fixed in a torque-proof manner. The sun gear So is constantly connected to a first shaft. An actuating element BE, which is longitudinally displaceable in two directions by an actuator (not shown), is arranged on a first side of the planetary gear set P. A second shaft is located on a second side opposite to the first side of the planetary gear set P. The second shaft is to assume, optionally, the rotational speed of the sun gear So, the rotational speed of the carrier St or a free rotational speed.

On the second side of the planetary gear set P, a first element E1, a second element E2 and a third element E3 are arranged, which together form a first shifting element SE1 and a second shifting element SE2. The second shaft is fixed in an axial manner by a mounting (not shown) and is constantly connected to the second element E2. The first element E1 is connected in a torque-proof manner to the carrier St, and is displaceable in an axial manner at this carrier St. In the same manner, the third element E3 is connected in a torque-proof manner to the sun gear So, and is displaceable in an axial manner at this sun gear So. For the sake of simplicity, such displaceability of the first and third elements E1, E3 is not shown.

Given an external constraint, the actuating element BE and the second element E2 cannot be arranged on the same side of the planetary gear set P. For example, an electric motor EM can be arranged, in a radial manner, outside the second element E2.

A first bridging device M1 is arranged in the operative connection between the actuating element BE and the first element E1. A second bridging device M2 is arranged in the operative connection between the actuating element BE and the third element E3. The first and second bridging devices each have an upwardly open groove, in which the lugs of the actuating element BE engage. The first and second bridging devices M1, M2 are arranged, in a radial manner, inside the carrier St of the planetary gear set P, in order to keep the relative speed between the lugs and the surface of the groove as small as possible.

If the actuating element BE is displaced into a first displacement direction T1, the lugs engage in an inner surface of the groove and thus displace the first and third elements E1, E3. As a result, the first and the third elements E1, E3 are displaced along the first displacement direction T1, until the first element E1 is overlaid with the second element E2. This corresponds to a first shifting state S1 of the shifting device. Through the formation of suitable synchronization toothings on the first and second elements E1, E2, a torque-proof, positive-locking connection between the first and second elements E1, E2 is thereby established.

If the actuating element BE is displaced in a second displacement direction T2 opposite to the first displacement direction T1, the first and third elements E1, E3 are displaced along the second displacement direction T2, until the third element E3 is overlaid with the second element E2. This corresponds to a second shifting state S2 of the shifting device. Through the formation of suitable synchronization toothings on the second and third elements E2, E3, a torque-proof, positive-locking connection between the second and third elements E2, E3 is thereby established. In a middle position of the actuating element BE, no overlap between the elements E1, E2, E3 arises, such that the second element E2 can assume a free rotational speed. FIG. 1 shows such a third shifting state S3, in which no overlap of the synchronization toothings arises.

Figure 2:
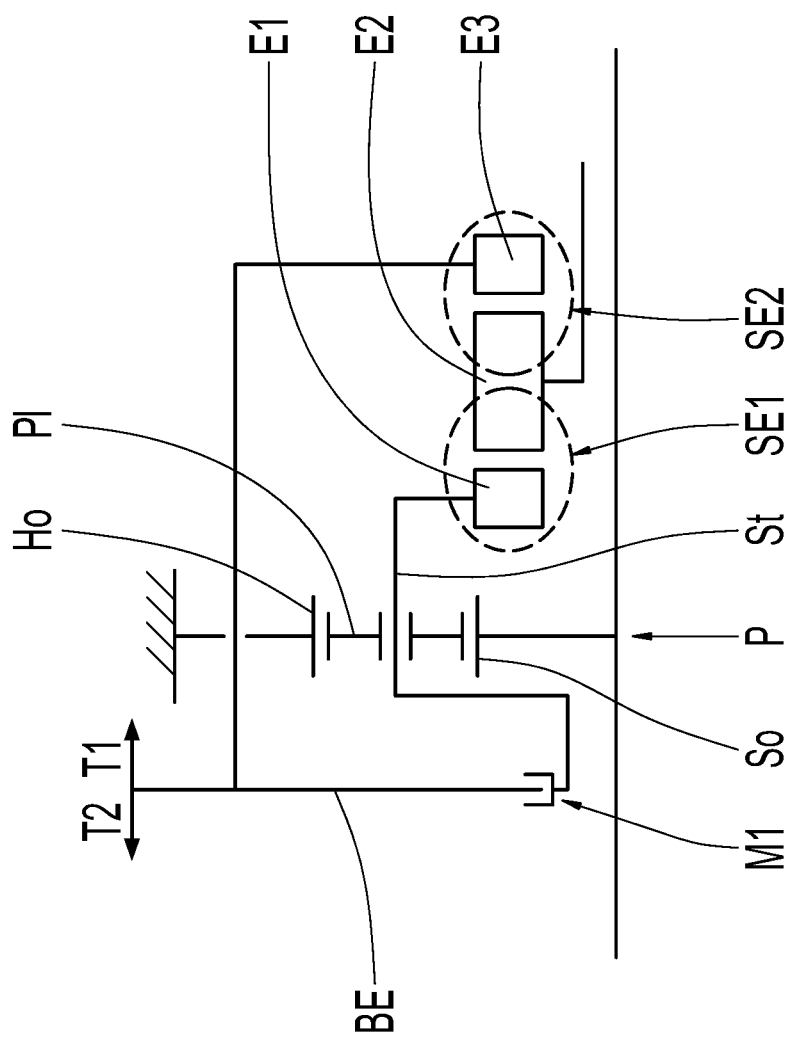
FIG. 2 schematically shows a second example embodiment of the shifting device.

FIG. 2 schematically shows a second embodiment of the shifting device. On the second side of the planetary gear set P, the first element E1, the second element E2 and the third element E3 are arranged, which together form the first shifting element SE1 and the second shifting element SE2. In this second embodiment, the second shaft optionally assumes the rotational speed of the carrier St, or assumes a free rotational speed, or is fixed in a torque-proof manner. For this purpose, first element E1 is connected in a torque-proof manner to the carrier St, and is displaceable in an axial manner at this carrier St. The third element E3 is connected in a torque-proof manner to a torque-proof component, such that the third element E3 cannot assume any rotational speed other than zero. The mode of action of the shifting device is identical to the first embodiment. A first clutch sleeve M1 is arranged in the operative connection between the actuating element BE and the first element E1. There is no differential rotational speed in the operative connection between the actuating element BE and the third element E3, by which a clutch sleeve is not required in such operative connection.

Figure 3:
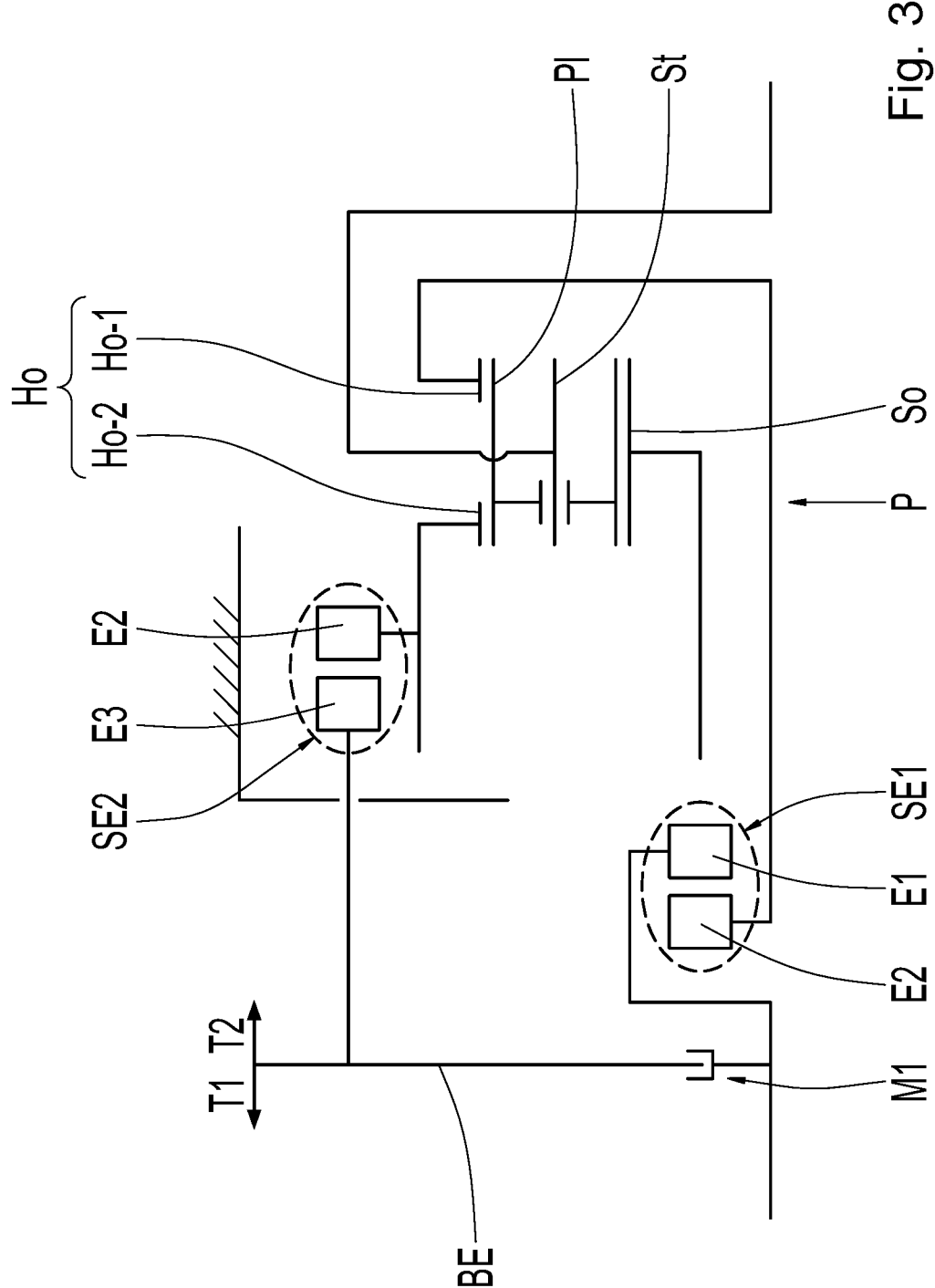
FIG. 3 schematically shows a third example embodiment of the shifting device.

FIG. 3 schematically shows a third embodiment of the shifting device. In this third embodiment, the planetary gear set P features a split ring gear Ho. Thereby, the ring gear Ho is split into a first segment Ho-1 and a second segment Ho-2. Between the two segments Ho-1 and Ho-2, a shaft leads to the carrier St of the planetary gear set P. The two segments Ho-1, Ho-2 have the same effective diameter. Therefore, there is no differential rotational speed between the two segments Ho-1, Ho-2. Thus, when viewed in terms of rotational speed, both segments Ho-1, Ho-2 can be regarded as components of the same shaft or the same element, as the case may be, as if they were connected to each other.

In the third embodiment, the ring gear Ho or the shaft connected to it, as the case may be, forms the second element E2 of the device. Through the first element E1, a torque-proof, positive-locking connection can be established at a section of the shaft that is connected to the first segment Ho-1. Through the third element E3, a torque-proof, positive-locking connection can be represented at a section of the shaft that is connected to the second segment Ho-2. For this purpose, two spatially separated synchronization toothings are formed at the second element E2. The ring gear Ho and the shaft or shaft sections, as the case may be, connected to it are fixed in the axial direction by a suitable mounting (not shown).

The first element E1 is connected in a torque-proof manner to the first shaft, and is displaceable in an axial manner at this shaft. The third element E3 is connected in a torque-proof manner to a torque-proof component, such that the third element E3 cannot assume any rotational speed other than zero. The first and third elements E1, E3 are coupled with each other, such that a displacement of the actuating element BE leads to a rectified displacement of the first and third elements E1, E3. A first clutch sleeve M1 is arranged in the operative connection between the actuating element BE and the first element E1, in order to compensate for the difference in rotational speeds between the actuating element BE and the first element E1.

If the actuating element BE is displaced into the first displacement direction T1, the first and the third elements E1, E3 are displaced along the first displacement direction T1, until the first element E1 is overlaid with that synchronization toothing at the second element E2 that is connected to the first segment Ho-1 of the ring gear Ho. As a result, a torque-proof, positive-locking connection is established between the first and second elements E1, E2. The first and second elements E1, E2 together form the first shifting element SE1.

If the actuating element BE is displaced into the second displacement direction T2, the first and the third elements E1, E3 are displaced along the second displacement direction T2, until the third element E3 is overlaid with that synchronization toothing at the second element E2 that is connected to the second segment Ho-2 of the ring gear Ho. As a result, a torque-proof, positive-locking connection is established between the second and third elements E2, E3. The second and third elements E2, E3 together form the second shifting element SE2.

Figure 4:
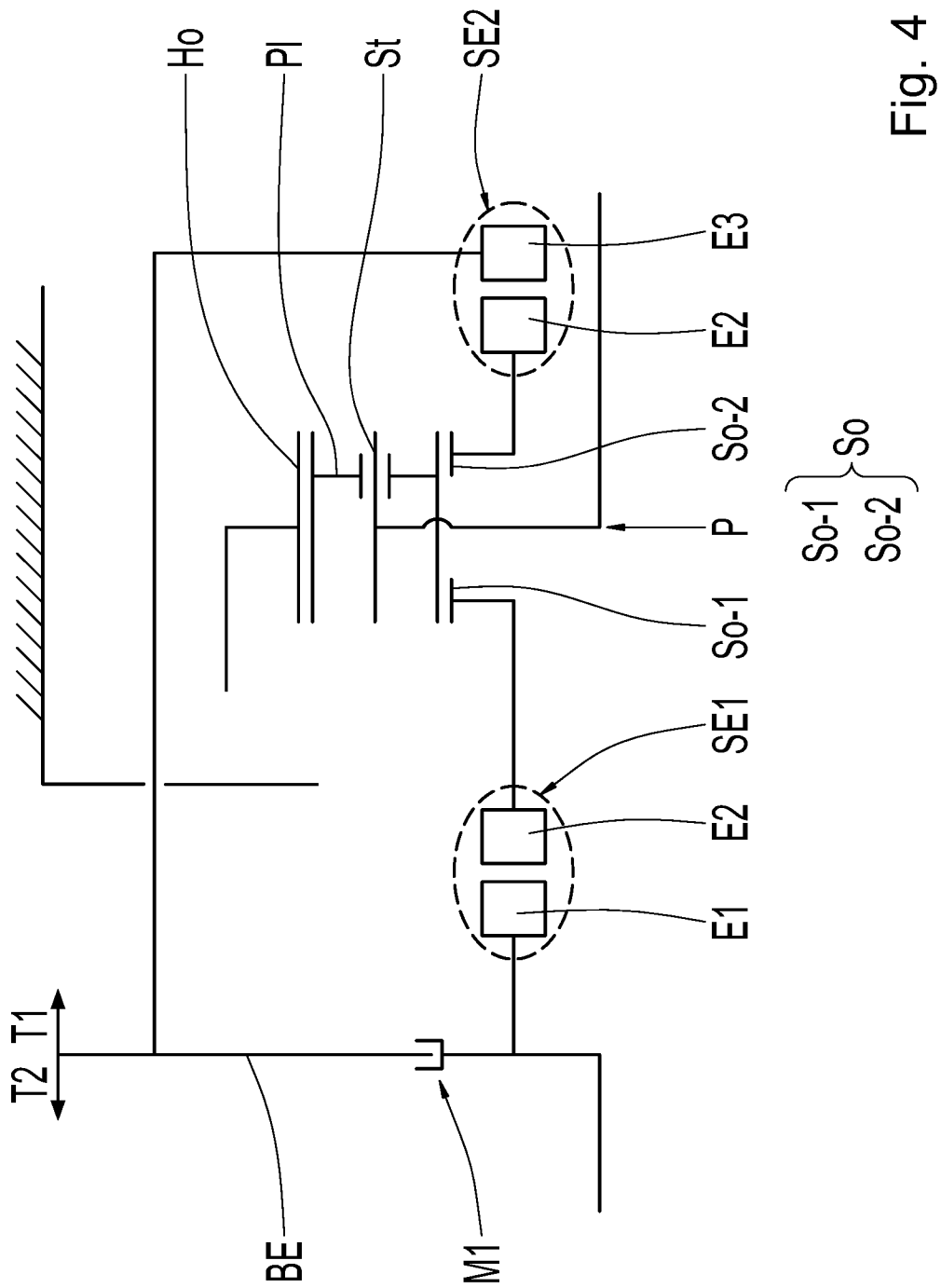
FIG. 4 schematically shows a fourth example embodiment of the shifting device.

FIG. 4 schematically shows a fourth embodiment of the shifting device. In this fourth embodiment, the planetary gear set P features a split sun gear So. Thereby, the sun gear is split into a first segment So-1 and a second segment So-2. Between the two segments So-1 and So-2, a shaft leads to the carrier St of the planetary gear set P. The two segments So-1, So-2 have the same effective diameter. Therefore, there is no differential rotational speed between the two segments So-1, So-2. Thus, when viewed in terms of rotational speed, both segments So-1, So-2 can be regarded as components of the same shaft or the same element, as the case may be, as if they were connected to each other. The rest of the mode of action is identical to the third embodiment.

Figure 5:
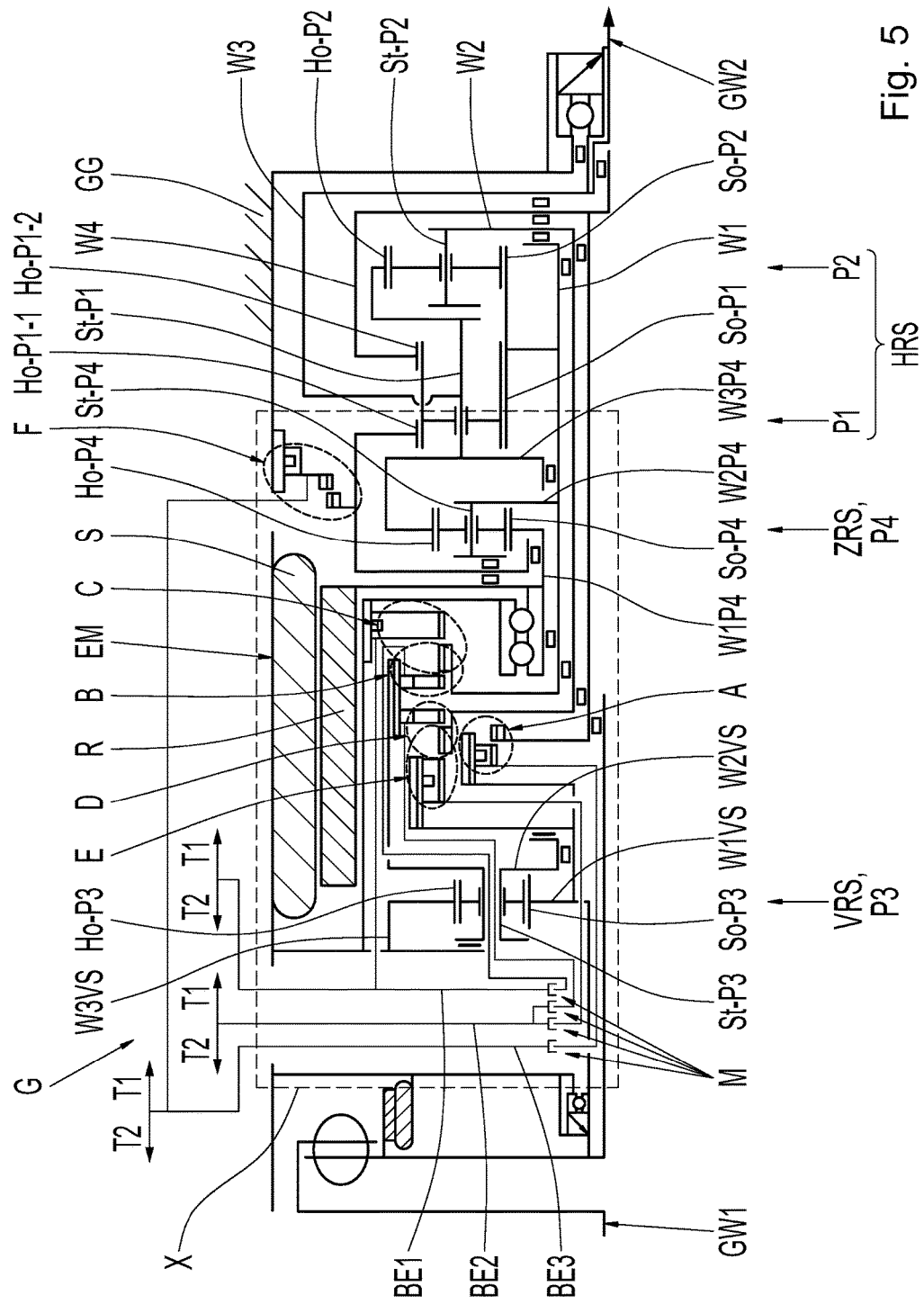
FIG. 5 shows a schematic view of an example transmission with multiple shifting devices.
Figure 6:
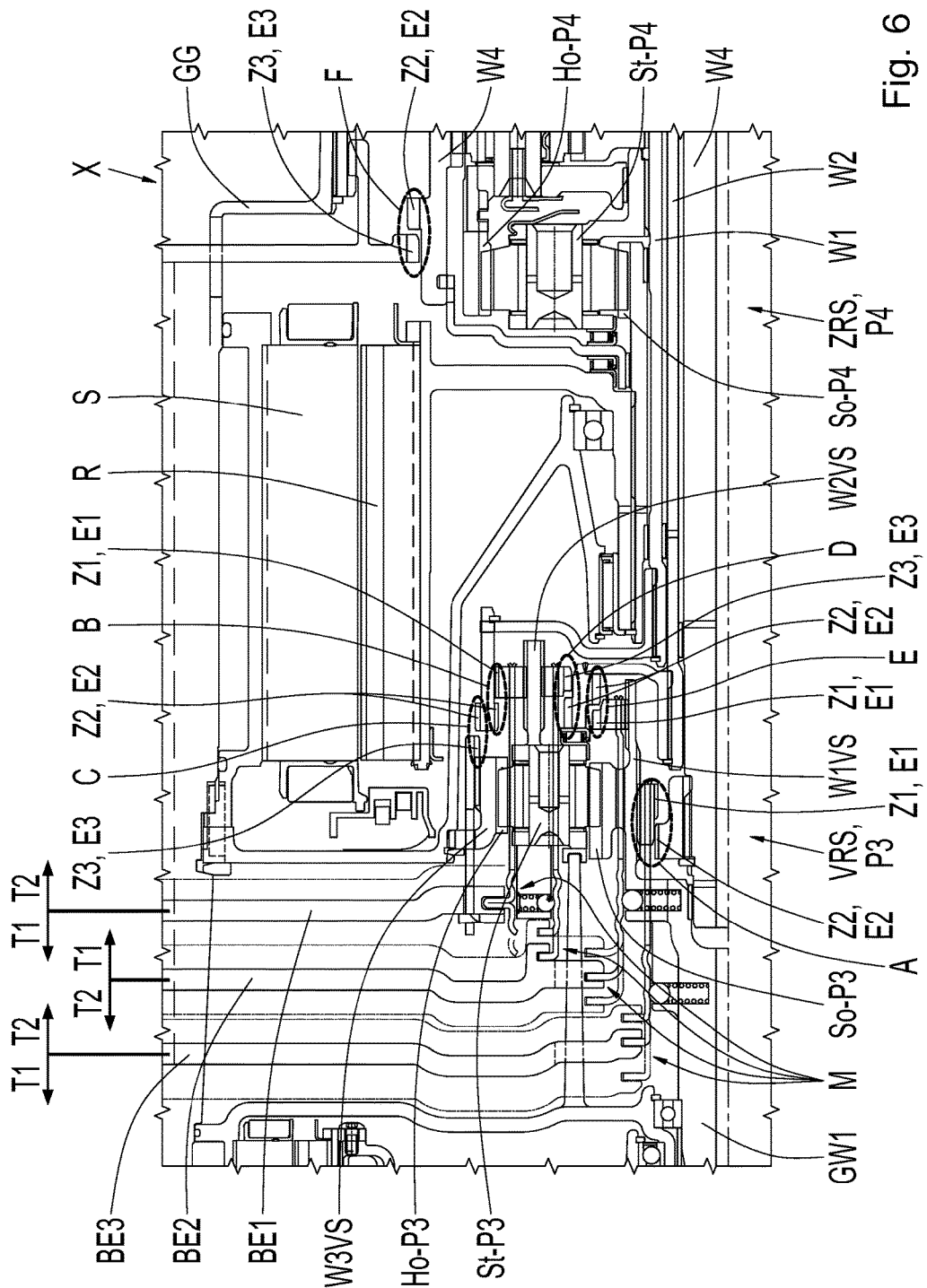
FIG. 6 shows a cut-out of a sectional view of the example transmission with multiple shifting devices.

FIG. 5 shows a schematic view of an exemplary transmission G with multiple shifting devices. FIG. 6 shows the cut-out of the transmission G, which is marked with an X in FIG. 5, in a sectional view. The transmission G features an upstream gear set VRS, an auxiliary gear set ZRS and a main gear set HRS, a transmission input shaft GW1 and a transmission output shaft GW2. The upstream gear set VRS features a planetary gear set P3, and the auxiliary gear set ZRS features a planetary gear set P4, while the main gear set HRS features a first planetary gear set P1 and a second planetary gear set P2. All planetary gear sets P1, P2, P3, P4 are formed as negative gear sets.

The transmission input shaft GW1 is connected to a sun gear So-P3 of the first planetary gear set P3 of the upstream gear set VRS. A ring gear Ho-P3 of the planetary gear set P3 of the upstream gear set VRS is connected in a torque-proof manner to the transmission housing GG of the transmission G, or to another fixed, torque-proof component of the transmission G. The sun gear So-P3 of the planetary gear set P3 of the upstream gear set VRS is a component of a first shaft W1VS of the upstream gear set VRS. A carrier St-P3 of the planetary gear set P3 of the upstream gear set VRS is a component of a second shaft W2VS of the upstream gear set VRS. That component on which the ring gear Ho-P3 of the planetary gear set P3 of the upstream gear set VRS is supported as referred to below as the third shaft W3VS of the upstream gear set VRS.

The sun gears So-P1, So-P2 of the first and second planetary gear sets P1, P2 of the main gear set HRS are connected to each other, and are components of a first shaft W1 of the main gear set HRS. The carrier St-P1 of the first planetary gear set P1 of the main gear set HRS is connected to the ring gear Ho-P2 of the second planetary gear set P2 of the main gear set HRS, and in such a way is a component of a third shaft W3 of the main gear set HRS. The ring gear Ho-P1 of the first planetary gear set P1 of the main gear set HRS is designed in two parts, and thus features a first segment Ho-P1-1 and a second segment Ho-P1-2. Both segments Ho-P1-1, Ho-P1-2 are components of a fourth shaft W4 of the main gear set HRS. One section of the third shaft W3 of the main gear set HRS runs between the two segments Ho-P1-1, Ho-P1-2 of the ring gear Ho-P1 and thus leads to a transmission output shaft GW2, which, in the embodiment shown, is coaxial to the transmission input shaft GW1. The carrier St-P2 of the second planetary gear set P2 of the main gear set HRS is a component of a second shaft W2 of the main gear set HRS.

The transmission G features an electric motor EM, whereas a stator S is connected in a torque-proof manner to the transmission housing GG of the transmission G or to another torque-proof component of the transmission G, such that the stator S cannot assume any rotational speed. A rotatably mounted rotor R is connected to a sun gear So-P4 of the planetary gear set P4 of the auxiliary gear set ZRS. The sun gear So-P4 of the planetary gear set P4 of the auxiliary gear set ZRS is a component of a first shaft W1P4 of the auxiliary gear set ZRS. A carrier St-P4 of the planetary gear set P4 of the auxiliary gear set ZRS is a component of a second shaft W2P4 of the auxiliary gear set ZRS, and is connected to the first shaft W1 of the main gear set HRS. A ring gear Ho-P4 of the planetary gear set P4 of the auxiliary gear set ZRS is a component of a third shaft W3P4 of the auxiliary gear set ZRS, and is connected to the third shaft W3 of the main gear set HRS.

A first shifting element B and a second shifting element C are allocated to the first shaft W1 of the main gear set HRS. Through the first shifting element B, the first shaft W1 of the main gear set HRS is connectable to the second shaft W2VS of the upstream gear set VRS. Through the second shift element C, the first shaft W1 of the main gear set HRS can be fixed in a torque-proof manner. A first shifting element E and a second shifting element D are also allocated to the second shaft W2 of the main gear set HRS. Through the first shifting element E, the second shaft W2 of the main gear set HRS are connectable to the first shaft W1VS of the upstream gear set VRS. Through the second shifting element D, the second shaft W2 of the main gear set HRS are connectable to the second shaft W2VS of the upstream gear set VRS. A first shifting element A and a second shifting element F are also allocated to the fourth shaft W4 of the main gear set HRS. Through the first shifting element A, the fourth shaft W4 of the main gear set HRS is connectable to the first shaft W1VS of the upstream gear set VRS. Through the second shift element F, the fourth shaft W4 of the main gear set HRS can be fixed in a torque-proof manner.

The first and second shifting elements B, C, which are allocated to the first shaft W1 of the main gear set HRS, can be actuated through the longitudinal displacement of a first actuating element BE1 along a first displacement direction T1 or a second displacement direction T2, as the case may be. For this purpose, a synchronization toothing Z2 is formed at one end of the first shaft W1 of the main gear set HRS, which is arranged, in a radial manner, inside the rotor R. The first shaft W1 of the main gear set HRS is fixed in an axial manner by a suitable mounting, and thus forms the second element E2 of the shifting device for the first and second shifting elements B, C. One element is arranged at one end of the second shaft W2VS of the upstream gear set VRS, which element is connected in an axially displaceable and torque-proof manner to the second shaft W2VS of the upstream gear set VRS. At one end, such element features a synchronization toothing Z1, and thus forms the first element E1 of the shifting device. The synchronization toothings Z1 and Z2 form the first shifting element B. At one structural element connected to the housing GG of the transmission G, an element is mounted in an axially displaceable manner. At one end, such element features a synchronization toothing Z3, and thus forms the third element E3 of the shifting device. The synchronization toothing Z2 and Z3 form the second shifting element C. The first and third elements E1, E3 are coupled with the first actuating element BE1. A clutch sleeve M is arranged in the operative connection between the first actuating element BE1 and the first element E1, by which the difference in rotational speeds between the first actuating element BE1 and the carrier St-P3 of the planetary gear set P3 of the upstream gear set VRS can be compensated. Thereby, the first element E1 of the shifting device extends through the carrier St-P3 of the planetary gear set P3 of the upstream gear set VRS.

The first and second shifting elements E, D, which are allocated to the second shaft W2 of the main gear set HRS, can be actuated through the longitudinal displacement of a second actuating element BE2 along the first displacement direction T1 or the second displacement direction T2, as the case may be. For this purpose, a synchronization toothing Z2 is formed at one end of the second shaft W2 of the main gear set HRS, which is arranged, in a radial manner, inside the rotor R. The second shaft W2 of the main gear set HRS is fixed in an axial manner by a suitable mounting, and thus forms the second element E2 of the shifting device for the first and second shifting elements E, D. One element is arranged at one end of the first shaft W1VS of the upstream gear set VRS, which element is connected in an axially displaceable and torque-proof manner to the first shaft W1VS of the upstream gear set VRS. At one end, such element features a synchronization toothing Z1, and thus forms the first element E1 of the shifting device. The synchronization toothings Z1 and Z2 form the first shifting element E. One element is arranged at one end of the second shaft W2VS of the upstream gear set VRS, which element is connected in an axially displaceable and torque-proof manner to the second shaft W2VS of the upstream gear set VRS. At one end, such element features a synchronization toothing Z3, and thus forms the third element E3 of the shifting device. The synchronization toothings Z2 and Z3 form the second shifting element D. The first and third elements E1, E3 are coupled with the second actuating element BE2. A clutch sleeve M is arranged in the operative connection between the second actuating element BE2 and the first element E1, by which the difference in rotational speeds between the second actuating element BE2 and the sun gear So-P3 of the planetary gear set P3 of the upstream gear set VRS can be compensated. A clutch sleeve M is arranged in the operative connection between the second actuating element BE2 and the third element E3, by which the difference in rotational speeds between the second actuating element BE2 and the carrier St-P3 of the planetary gear set P3 of the upstream gear set VRS can be compensated.

The first and second shifting elements A, F, which are allocated to the fourth shaft W4 of the main gear set HRS, can be actuated through the longitudinal displacement of a third actuating element BE3 along the first displacement direction T1 or the second displacement direction T2, as the case may be. For this purpose, a synchronization toothing Z2 is formed at one end of the fourth shaft W4 of the main gear set HRS, which is connected to the second segment Ho-P1-2 of the ring gear Ho-P1 of the first planetary gear set P1 of the main gear set HRS. An additional synchronization toothing Z2 is formed at another location of the fourth shaft W4 of the main gear set, which is connected to the first segment Ho-P1-1 of the ring gear Ho-P1 of the first planetary gear set P1 of the main gear set HRS. The fourth shaft W4 of the main gear set HRS is fixed in an axial manner by a suitable mounting, and thus forms the second element E2 of the shifting device for the first and second shifting elements A, F. One element is arranged at one end of the first shaft W1VS of the upstream gear set VRS, which element is connected in an axially displaceable and torque-proof manner to the first shaft W1VS of the upstream gear set VRS. At one end, such element features a synchronization toothing Z1, and thus forms the first element E1 of the shifting device. The synchronization toothings Z1 and that synchronization toothing Z2 that is connected to the second segment Ho-P1-2 form the first shifting element A. At one structural element connected to the housing GG of the transmission G, an element is mounted in an axially displaceable manner. At one end, such element features a synchronization toothing Z3, and thus forms the third element E3 of the shifting device. The synchronization toothing Z3 and that synchronization toothing Z2 that is connected to the first segment Ho-P1-1 form the second shifting element F. A clutch sleeve M is arranged in the operative connection between the third actuating element BE3 and the first element E1, by which the difference in rotational speeds between the third actuating element BE3 and the sun gear So-P3 of the planetary gear set P3 of the upstream gear set VRS can be compensated.

FIG. 6 shows a cut-out X of a sectional view of the transmission G with multiple shifting devices. Therein, the synchronization toothings Z1, Z2 for each of the first shifting elements A, B, E and the synchronization toothings Z2, Z3 for each of the second shifting elements F, C, D are shown in detail. The various positions of the actuating element BD, BE, BE3 in the different shifting states S1, S2, S3 are indicated, whereas all shifting elements A, B, C, D, E, F are shown in the third shifting state S3. The coupling of the first and second shifting elements A, F, which are allocated to the fourth shaft W4 of the main gear set HRS, is also indicated. In contrast to the arrangement in FIG. 5, the displacement directions T1, T2 allocated to the actuating elements BD, BE2, BE3 are not all concordant.

Modifications and variations can be made to the embodiments illustrated or described herein without departing from the scope and spirit of the invention as set forth in the appended claims.

REFERENCE SIGNS

G Transmission
GG Housing
GW1 Transmission input shaft
GW2 Transmission output shaft
HRS Main gear set
ZRS Auxiliary gear set
VRS Upstream gear set
EM Electric motor
R Rotor of the electric motor
S Stator of the electric motor
P Planetary gear set
P1 First planetary gear set of the main gear set
P2 Second planetary gear set of the main gear set
P3 Planetary gear set of the upstream gear set
P4 Planetary gear set of the auxiliary gear set
W1 First shaft of the main gear set
W2 Second shaft of the main gear set
W3 Third shaft of the main gear set
W4 Fourth shaft of the main gear set
W1VS First shaft of the upstream gear set
W2VS Second shaft of the upstream gear set
W3VS Third shaft of the upstream gear set
W1P4 First shaft of the auxiliary gear set
W2P4 Second shaft of the auxiliary gear set
W3P4 Third shaft of the auxiliary gear set
A, B, E First shifting element
F, C, D Second shifting element
SE1 First shifting element
SE2 Second shifting element
So Sun gear
So-1 First segment of the sun gear
So-2 Second segment of the sun gear
St Carrier
Ho Ring gear
Ho-1 First segment of the ring gear
Ho-2 Second segment of the ring gear
So-P1 Sun gear of the first planetary gear set of the main gear set
St-P1 Carrier of the first planetary gear set of the main gear set
Ho-P1 Ring gear of the first planetary gear set of the main gear set
Ho-P1-1 First segment of the ring gear of the first planetary gear set of the main gear set
Ho-P1-2 Second segment of the ring gear of the first planetary gear set of the main gear set
So-P2 Sun gear of the second planetary gear set of the main gear set
St-P2 Carrier of the second planetary gear set of the main gear set
Ho-P2 Ring gear of the second planetary gear set of the main gear set So-P3 Sun gear of the first planetary gear set of the upstream gear set
St-P3 Carrier of the first planetary gear set of the upstream gear set
Ho-P3 Ring gear of the second planetary gear set of the upstream gear set
So-P4 Sun gear of the planetary gear set of the auxiliary gear set
St-P4 Carrier of the planetary gear set of the auxiliary gear set
E1 First element
E2 Second element
E3 Third element
Z1 Synchronization toothing
Z2 Synchronization toothing
Z3 Synchronization toothing
BE Actuating element
BE1 First actuating element
BE2 Second actuating element
BE3 Third actuating element
T1 First displacement direction
T2 Second displacement direction
M Bridging device
M1 First bridging device
M2 Second bridging device
S1 First shifting state
S2 Second shifting state
S3 Third shifting state

The invention claimed is:

1. A planetary transmission, comprising:
a shifting device for shifting a first shifting element and a second shifting element;
wherein the first shifting element is operable to establish a torque-proof, positive-locking connection between a first element and a second element, a common actuating element being longitudinally displaceable along a first displacement direction during actuation of the first shifting element;
wherein the second shifting element is operable to establish a torque-proof, positive-locking connection between the second element and a third element, the common actuating element being longitudinally displaceable along a second displacement direction during actuation of the second shifting element, the second displacement direction being opposite the first displacement direction;
wherein the first shifting element is closed and the second shifting element is open in a first shifting state, and the first shifting element is open and the second shifting element is closed in a second shifting state,
wherein the first element is coupled to the third element such that displacement of the first element by the common actuating element in one of the first and second displacement directions provides rectified displacement of the third element, the third element is coupled to the first element such that displacement of the third element by the common actuating element in one of the first and second displacement directions provides rectified displacement of the first element, and the second element is fixed in position in both the first and second displacement directions.

2. The planetary transmission of claim 1, wherein the first element is connected in a torque-proof manner to a carrier of a planetary gear set and the third element is connected in a torque-proof manner to a sun gear or a ring gear of the planetary gear set, wherein the common actuating element is arranged on a first side of the planetary gear set and the second element is arranged on a second side of the planetary gear set opposite the first side.

3. The planetary transmission of claim 2, wherein the first element is axially displaceable with respect to the carrier of the planetary gear set.

4. The planetary transmission of claim 2, wherein the third element is connected in a torque-proof manner to the sun gear of the planetary gear set and is axially displaceable with respect to the sun gear, or the third element is connected in a torque-proof manner to the ring gear of the planetary gear set and is axially displaceable with respect to the ring gear.

5. The planetary transmission of claim 1, wherein the second element is connected in a torque-proof manner to the ring gear of the planetary gear set, the ring gear comprising a first segment and a second segment that are separate, a torque-proof connection to the first segment or a shaft section connected to the first segment establishable through the first element, and a torque-proof connection to the second segment or a shaft section connected to the second segment establishable through the third element.

6. The planetary transmission of claim 1, wherein the second element is connected in a torque-proof manner to the sun gear of the planetary gear set, the sun gear comprises a first segment and a second segment that are separate, a torque-proof connection to the first segment or a shaft section connected to the first segment establishable through the first element, and a torque-proof connection to the second segment or a shaft section connected to the second segment establishable through the third element.

7. The planetary transmission of claim 1, wherein a bridging device is arranged in an operative connection between the common actuating element and at least one of the first and third elements, by which a difference in rotational speeds between the common actuating element and the first or third elements is compensable.

8. The planetary transmission of claim 7, wherein a first bridging device is arranged in the operative connection between the common actuating element and the first element, and a second bridging device is arranged in the operative connection between the common actuating element and the third element, the first and second bridging devices arranged in parallel.

9. The planetary transmission of claim 8, wherein the first bridging device and the second bridging device are arranged radially inside a carrier of a planetary gear set.

10. The planetary transmission of claim 1, wherein the first shifting element and the second shifting element are open in a third shifting state.

11. A transmission for a motor vehicle, comprising:
a main gear set, the main gear set having at least two planetary gear sets with a plurality of shafts;
a first shifting element and a second shifting element allocated to at least one selected shaft of the main gear set, a torque-proof, positive-locking connection establishable between the selected shaft of the main gear set and an element of the transmission through the first shifting element, a torque-proof, positive-locking connection establishable between the selected shaft of the main gear set and an additional element of the transmission through the second shifting element,
wherein the first shifting element is closed and the second shifting element is open in a first shifting state, the first shifting element is open and the second shifting element is closed in a second shifting state,
wherein the selected shaft of the main gear set is fixed in an axial direction, one or more synchronization toothings are formed at the selected shaft of the main gear set through which the first and second shifting elements form the positive-locking, torque-proof connection with the selected shaft, the complementary synchronization toothings of the first and second shifting elements being coupled with each other and axially displaceable such that the synchronization toothing of the first shifting element is engageable with the synchronization toothing at the selected shaft of the main gear set upon displacement of a common actuating element along a first displacement direction parallel to an axis of the selected shaft of the main gear set, and the synchronization toothing of the second shifting element is engageable with the synchronization toothing at the selected shaft of the main gear set upon displacement of the common actuating element along a second displacement direction opposite to the first displacement direction.

12. The transmission of claim 11, wherein the first shifting element and the second shifting element are open in a third shifting state.

* * * * *